US012627965B2

(12) United States Patent
Kaushik et al.

(10) Patent No.: US 12,627,965 B2
(45) Date of Patent: May 12, 2026

(54) REDUCED MESSAGING TO THE UDM DURING AN AMF HANDOVER

(71) Applicant: T-Mobile USA, Inc., Bellevue, WA (US)

(72) Inventors: Subramania Kaushik, Bellevue, WA (US); Anil Kumar Mariyani, Ashburn, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 213 days.

(21) Appl. No.: 18/229,167

(22) Filed: Aug. 1, 2023

(65) Prior Publication Data

US 2025/0048075 A1    Feb. 6, 2025

(51) Int. Cl.
| | |
|---|---|
| *H04W 8/08* | (2009.01) |
| *H04W 8/18* | (2009.01) |
| *H04W 36/00* | (2009.01) |
| *H04W 60/04* | (2009.01) |

(52) U.S. Cl.
CPC .............. *H04W 8/08* (2013.01); *H04W 8/18* (2013.01); *H04W 36/0011* (2013.01); *H04W 60/04* (2013.01)

(58) Field of Classification Search
CPC ..... H04W 8/08; H04W 8/18; H04W 36/0011; H04W 60/04; H04W 8/20; H04W 36/0033
See application file for complete search history.

(56) References Cited

U.S. PATENT DOCUMENTS

| | | |
|---|---|---|
| 11,818,578 B2 | 11/2023 | Li et al. |
| 2019/0007500 A1* | 1/2019 | Kim ..................... H04L 67/141 |

| | | |
|---|---|---|
| 2019/0053295 A1 | 2/2019 | Castellanos Zamora et al. |
| 2019/0174449 A1 | 6/2019 | Shan et al. |
| 2019/0199802 A1 | 6/2019 | Zhu et al. |
| 2019/0230556 A1 | 7/2019 | Lee |
| 2020/0084675 A1 | 3/2020 | Lu et al. |
| 2021/0029603 A1 | 1/2021 | Kim et al. |
| 2021/0105847 A1 | 4/2021 | Prabhakar et al. |
| 2021/0385625 A1 | 12/2021 | Qiao et al. |

(Continued)

OTHER PUBLICATIONS

3GPP; TSG SA, "Procedures for the 5G Systems (5GS); Stage 2 (Release 18)", 3GPP TS 23.502, vol. 18.2.0, Jun. 29, 2023.
Nokia, et al., "AMF to indicate the capability of supporting non-3GPP access path switching", C1-232484, 3GPP TSG-CT WG1, Meeting #141-e, Apr. 10, 2023, pp. 1-63.
Nokia, et al., "Network indication to the UE for discontinuous coverage of satellite access support", C1-232149, 3GPP TSG-CT WG1, Meeting #141-e, Apr. 10, 2023, pp. 1-62.

(Continued)

*Primary Examiner* — Khoa Huynh
(74) *Attorney, Agent, or Firm* — Lee & Hayes, P.C.

(57) ABSTRACT

An access and mobility management function (AMF) configured to obtain subscriber profile information without sending a get message and a subscribe message to a unified data management node (UDM) is described herein. The AMF is a new AMF that receives a registration request as part of a handover from an old AMF and receives user equipment (UE) context information from the old AMF. Without sending a get message to the UDM, the AMF obtains subscriber profile information by either fetching the subscriber profile information from an unstructured data storage function (UDSF) shared by a pool of AMFs, when the UDSF is available, or receiving the subscriber profile information from old AMF, when the UDSF is not available. Also, without sending a subscribe message to the UDM, the AMF receives notification of changes to the subscriber profile information from the UDM.

20 Claims, 4 Drawing Sheets

(56)         References Cited

U.S. PATENT DOCUMENTS

| | | | | |
|---|---|---|---|---|
| 2022/0167244 A1* | 5/2022 | Zaus | ........................ | H04L 69/24 |
| 2022/0201638 A1 | 6/2022 | Arrobo Vidal et al. | | |
| 2022/0338099 A1 | 10/2022 | Zhu et al. | | |
| 2022/0386399 A1 | 12/2022 | Huang et al. | | |
| 2022/0394566 A1 | 12/2022 | Liu et al. | | |
| 2022/0408395 A1* | 12/2022 | Li | ........................... | H04W 8/02 |
| 2022/0408397 A1 | 12/2022 | Zhu et al. | | |
| 2023/0189194 A1 | 6/2023 | Ayers et al. | | |
| 2024/0121588 A1 | 4/2024 | Tian et al. | | |
| 2024/0205863 A1 | 6/2024 | Nassar et al. | | |
| 2025/0048302 A1 | 2/2025 | Kaushik | | |
| 2025/0056333 A1 | 2/2025 | Kaushik | | |

OTHER PUBLICATIONS

Sharp, et al., "Capability negotiation for Discontinuous Coverage Supported", C1-232326, 3GPP TSG-CT WG1, Meeting #141-e, Apr. 10, 2023, pp. 1-90.
Search Report and Written Opinion for International Application No. PCT/US2024/040399, Dated Nov. 13, 2024, 8 pages.
Search Report and Written Opinion for International Application No. PCT/US2024/040409, Dated Nov. 13, 2024, 9 pages.
Search Report and Written Opinion for International Application No. PCT/US24/40422, Dated Nov. 5, 2024, 9 pages.

* cited by examiner

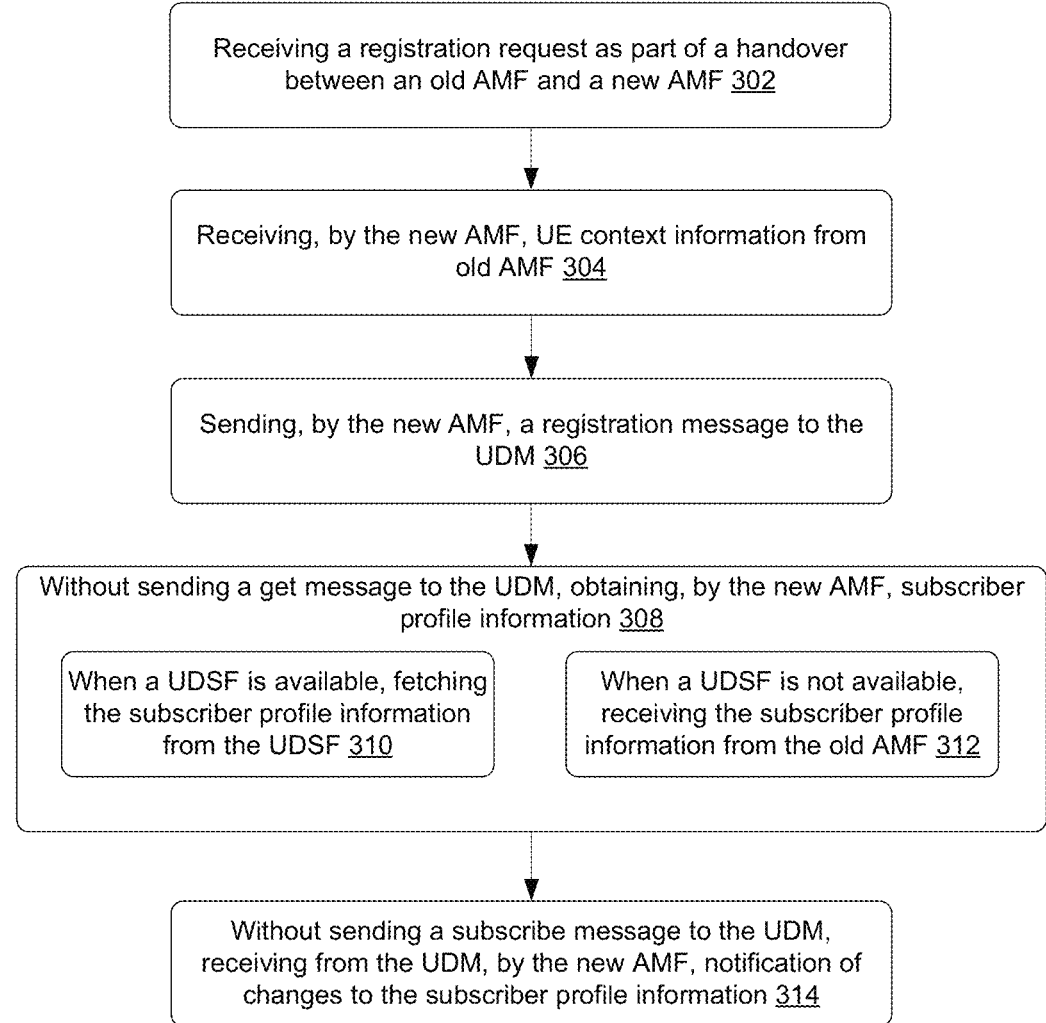

Receiving a registration request as part of a handover between an old AMF and a new AMF 302

Receiving, by the new AMF, UE context information from old AMF 304

Sending, by the new AMF, a registration message to the UDM 306

Without sending a get message to the UDM, obtaining, by the new AMF, subscriber profile information 308

When a UDSF is available, fetching the subscriber profile information from the UDSF 310

When a UDSF is not available, receiving the subscriber profile information from the old AMF 312

Without sending a subscribe message to the UDM, receiving from the UDM, by the new AMF, notification of changes to the subscriber profile information 314

FIG.3

REDUCED MESSAGING TO THE UDM DURING AN AMF HANDOVER

BACKGROUND

The increased availability and performance characteristics of fifth generation (5G) networks have greatly enhanced the communication experiences of users. In some environments, however, the relative capabilities of fourth generation (4G) networks and 5G networks may result in handovers from 5G to 4G and, as environment, use, and characteristics vary, handovers back from 4G to 5G. The frequency of handovers has greatly increased signaling among core network nodes, including signaling to the unified data management node (UDM) and the associated unified data repository (UDR). Handovers to 5G may result, for example, in registration messages from an access and mobility management function (AMF) to the UDM, get messages to the UDM, subscribe messages to the UDM, each of these in turn causing a request and response between the UDM and UDR. Handovers away from 5G may result in loss of information obtained by the AMF from these messages, requiring their repetition with each return to 5G.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 3 is a flow diagrams of an illustrative process at an AMF for obtaining subscriber profile information for the AMF during an AMF-to-AMF handover while optimizing signaling between the new AMF and the UDM.

DETAILED DESCRIPTION

This disclosure is directed in part to an AMF configured to obtain subscriber profile information without sending a get message and a subscribe message to a UDM. The AMF is a new AMF that receives a registration request as part of a handover from an old AMF and receives UE context information from the old AMF. Without sending a get message to the UDM, the AMF obtains subscriber profile information either by fetching the subscriber profile information from an unstructured data storage function (UDSF) shared by a pool of AMFs, when the UDSF is available, or receiving the subscriber profile information from old AMF, when the UDSF is not available. Also, without sending a subscribe message to the UDM, the AMF receives notification of changes to the subscriber profile information from the UDM.

As used herein, the terms "new AMF" and "old AMF" refer to the recipient and source of a handover between AMFs, respectively. They do not refer to an "age" of the AMF (e.g., time since implementation) or any other relative roles.

In various implementations, the subscriber profile information received from the old AMF or from a UDSF common to the new AMF and old AMF may include at least one of access management information, session management information, or subscriber data. Along with the retrieval or reception of the subscriber profile data, the new AMF may receive UE context information from the old AMF as part of a UE context transfer. Such UE context information may include at least one of UE mobility management information, security context information, a subscription permanent identifier (SUPI), 5G global unique temporary identifier (5G GUTI), or UE capabilities. By obtaining this information, the new AMF removes the need for a get message from itself to the UDM.

In further implementations, the UDM may be configured to maintain the subscriber profile information, too, and send notification of changes to the subscriber profile information to the new AMF without the new AMF subscribing for change notifications. By the UDM behaving as if it received a subscribe message (without actually receiving one), the need for a subscribe message from the new AMF to the UDM is also removed.

Figure 1:
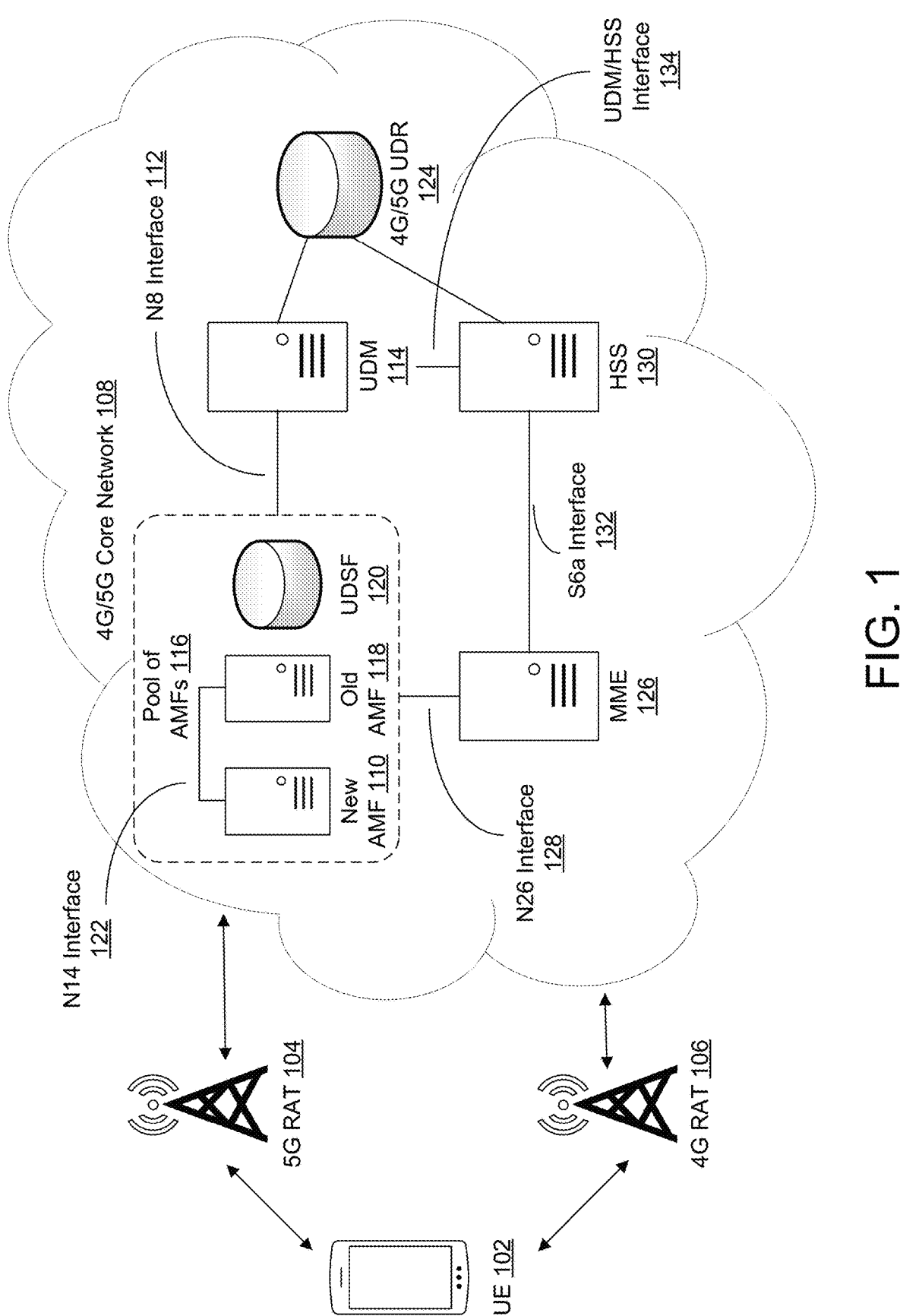
FIG. 1 is a diagram of a telecommunication network having a combined 4G/5G core network ("core network") and 4G and 5G radio access technologies (RATs) available to user equipment (UE) via access networks, the nodes of the core network engaging in signaling and data retention to handle handovers in a manner that optimizes user experience and resource usage.

FIG. 1 is a diagram of a telecommunication network having a combined 4G/5G core network ("core network") and 4G and 5G RATs available to UEs via access networks, the nodes of the core network engaging in signaling and data retention to handle handovers in a manner that optimizes user experience and resource usage. As illustrated, a UE 102 may connect to a 5G RAT 104 or a 4G RAT 106 of one or more access networks and may be directed from one to the other through handover operations. The base station(s) implementing the RATs 104 and 106 may in turn be connected to a combined 4G/5G core network 108 ("core network 108"). The core network 108 may include a new AMF 110 connected to a UDM 112 via an N8 interface 114. The new AMF 110 may be part of a pool 116 of AMFs, the pool 116 also including an old AMF 118 and an unstructured data storage function (UDSF) 120. The new AMF 110 and old AMF 118 of the pool 116 may also be connected via N14 interfaces 122, enabling handovers among the new AMF 110 and old AMF 118 of the pool 116. The UDM 112 may be connected to a UDR 124, the UDR 124 serving as a common storage repository for 5G and 4G elements of the core network 108. The core network 108 may also include a mobility management entity (MME) 126, which may communicate with the new AMF 110 and old AMF 118 through an N26 interface 128 to facilitate 4G/5G handovers. The MME 126 may be connected to an HSS 130, the HSS 130 accessing the UDR 124 and managing the data therein in an analogous manner to the UDM 112. The MME 126 and HSS 130 may be connected via a S6a interface 132. Lastly, there may be an interface 134 between the UDM 112 and HSS 130.

The UE 102 may be any sort of UE, such as a cellular phone, a mobile device, an Internet-of-Things device (such as a watch, goggles, or other wearable device), a tablet computer, a personal computer (PC), or any sort of device capable of wireless connectivity to one or more access points and of being moved from location to location.

In various implementations, the 5G RAT 104 may be implemented by a gNode B (gNB)—a 5G base station. The 4G RAT 106 may be implemented by an eNode B (eNB)—a 4G/Long Term Evolution (LTE) base station. The gNB and eNB may be co-located at a same cell site or at different cell sites and may each, through its respective 5G RAT 104 or 4G RAT 106, offer connectivity to the UE 102 and any other UEs in proximity and capable of connecting to that radio access technology. Based on factors such as the location of the UE 102, the number of UEs utilizing the spectrum of the radio access technology, and the types of services those UEs are using, either of the 5G RAT 104 or the 4G RAT 106 may offer a better user experience at a different point in time, leading to handovers of the UE 102 between the 5G RAT 104 and 4G RAT 106. The rules and thresholds governing the handovers may in some circumstances lead to frequent handovers. These frequent handovers in turn result in an increased signaling burden on the core network 108.

In some implementations, the core network 108 includes nodes and devices from both 4G core networks and 5G core networks. As shown, the core network 108 includes at least new AMF 110, old AMF 118, UDSF 120, UDM 112, UDR 124, MME 126, and HSS 130. The core network 108 may also include serving gateways (SGw), packet data network gateways (PGw), session management functions (SMF), user plane function (UPF), policy control function (PCF), or one or more nodes of an Internet protocol multimedia subsystem (IMS), such as a call session control function (CSCF) and its nodes (proxy CSCF (P-CSCF), interrogating CSCF (I-CSCF), and serving CSCF (S-CSCF)) or a policy and charging rule function (PCRF). The different ones among the 4G core network nodes and 5G core network nodes may support their respective, corresponding one of the 4G RAT 106 and 5G RAT 104 and, to support handovers, may communicate with each other over interfaces (e.g., the N14 interface 122 between the new AMF 110 and old AMF 118).

In various implementations, the new AMF 110 and old AMF 118 may belong to a same pool 116 of AMFs, which may be associated with a physical location/region. The AMFs of pool 116, including the new AMF 110 and old AMF 118 may maintain their own storage and share information (e.g., via the N14 interface 122), may utilize a common UDSF 120 to store shared information for the AMFs, or some combination of these approaches. The N14 interface 122 may also be used for handovers between the AMFs, such as between new AMF 110 and old AMF 118, in which the AMF receiving the handover may receive information stored by the old AMF, by the UDSF, or both. The AMF, such as the new AMF 110 or old AMF 118, for a given UE, such as UE 102, may receive connection and session related information for the UE, handle connection and mobility management tasks, and forward information for session management to an SMF.

Figure 2:
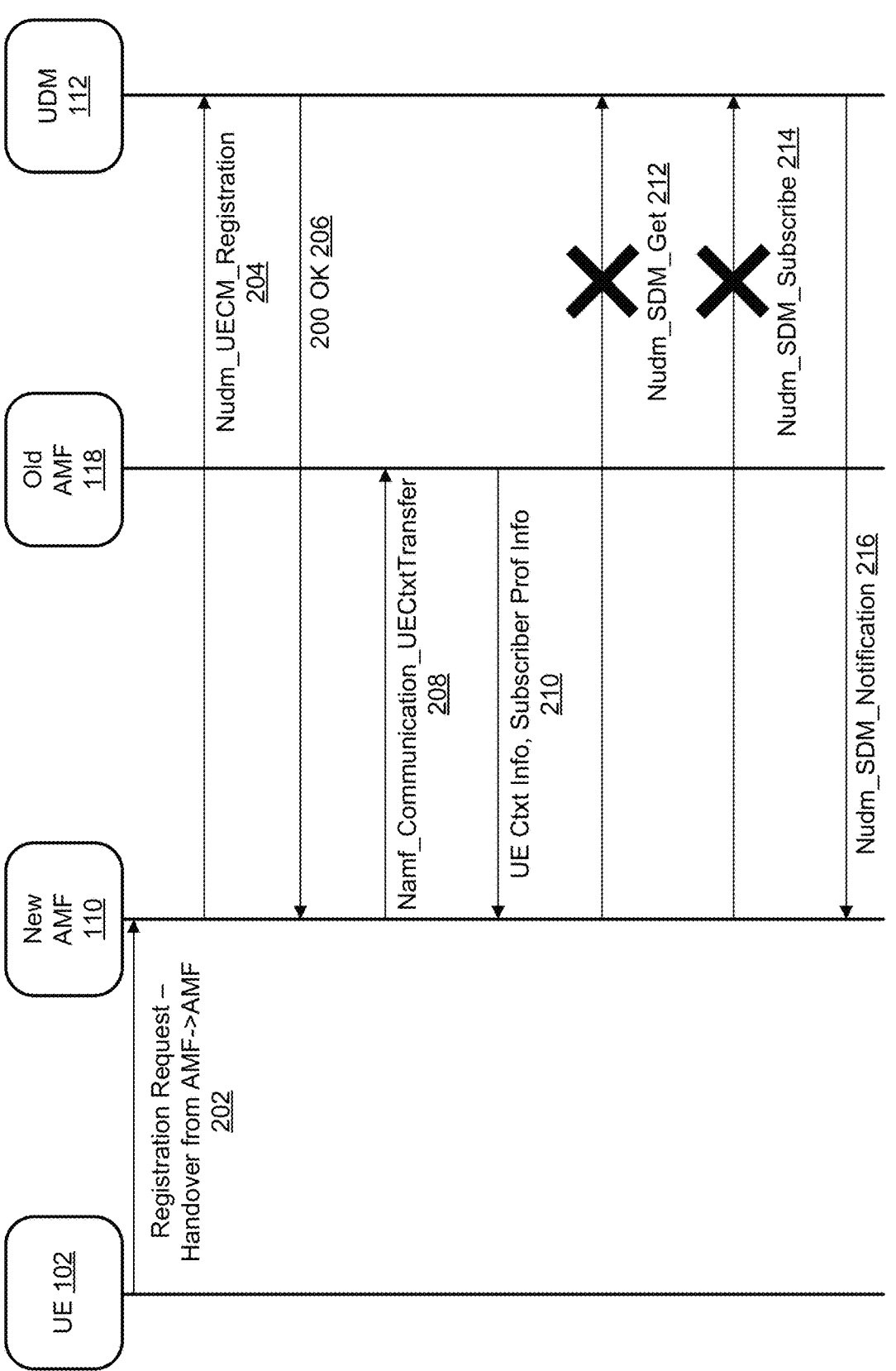
FIG. 2 is a message flow diagram showing a subset of core network nodes and a UE and the messages among these nodes and devices to obtain subscriber profile information for the AMF during an AMF-to-AMF handover while optimizing signaling between the new AMF and the UDM.

Additionally, the new AMF 110 and old AMF 118 send messages to UDM 112 over the N8 interface 114 (for further discussion of FIG. 1, new AMF 110 will be referred to, but with the understanding that what is said of new AMF 110 may apply to old AMF 118 or any other AMF of the pool 116 of AMFs). Some of these messages over the N8 interface 114 are generated as part of handovers between 4G and 5G of between AMFs, and with frequent handovers, a substantial volume of messages can be generated and impact performance of the new AMF 110 and UDM 112. Additional details of such messaging are shown in FIGS. 2 and 3 and described further herein with reference to those figures and in other discussions.

In some implementations, the UDM 112 serves as front-end for user subscription data stored in the UDR 124 to other 5G nodes of the core network 108. The messages through which the UDM 112 requests information and receives it in response from the UDR 124 may conform to a lightweight directory access protocol (LDAP). The UDR 124 serves as the centralized repository of information for the core network 108, storing subscriber profile information, policy data, structured data, application data, etc. In some implementations, in core network 108, the UDR 124 may serve as the centralized repository of information for both 5G nodes (through UDM 112) and 4G nodes (through HSS 130).

In various implementations, the MME 126 provides session management and supports subscriber authentication, roaming, and handovers related to UEs connected to 4G RAT 106. To support handovers from 4G to 5G and from 5G to 4G, the MME 126 may communicate with AMF 110 through an N26 interface 128 between the MME 126 and new AMF 110. Also, to provide and receive subscriber information to/from HSS 130, the MME may communicate with the HSS 130 via a S6a interface 132. Information such as authentication, location, and service information may be communicated over the S6a interface 132.

The HSS 130 is the subscriber information database for 4G nodes of core network 108 and either mirrors the UDR 124 or serves as a front end to the UDR 124 for the 4G nodes. In the context of handovers, it may also communicate with the UDM 112 over an interface 134, which may be a proprietary interface or an interface in accordance with standards, such as those of the Third Generation Partnership Project (3GPP).

FIG. 2 is a message flow diagram showing a subset of core network nodes and a UE and the messages among these nodes and devices to obtain subscriber profile information for the AMF during an AMF-to-AMF handover while optimizing signaling between the new AMF and the UDM. As illustrated, a UE 102, new AMF 110, old AMF 118, and UDM 112 exchange messages. Also, the messages shown in FIG. 2 are in the context of a handover from between AMFs.

As illustrated, new AMF 110 receives a registration request 202 from the UE 102. The registration request 202 is associated with a handover from the old AMF 118 to the new AMF 110 and may also be associated with an inter-gNB handover.

After receiving the registration request 202, the new AMF 110 sends a registration message 204, such as a Nudm_UECM_Registration request message, to the UDM 112. Such a message 204 may be send over the N8 interface 114 between the new AMF 110 and UDM 112. The registration message 204 may further include a flag indicating that the registration message is associated with an inter-AMF handover. Such information may be used by the UDM 112 to determine a uniform resource identifier (URI) for the new AMF 110. The UDM 112 may retrieve such a URI from the registration message 204, if the URI is included, or from another source (e.g., the UDR 124) which maintains information associated with the new AMD 110. The UDM 112 may then respond to the new AMF 110 with a 200 OK message 206.

In various implementations, the UDM 112 may make a request to the UDR 124 and receive a response from the UDR 124, both in accordance with LDAP. The request may be a Nudr_UDM_Query request and the response may be a Nudr_UDM_Query response. Such a request and response, not shown in FIG. 2, may follow any of the messages received by the UDM 112.

In various implementations, the new AMF 110 then requests UE context information from the old AMF 118 by, e.g., sending a namf_Communication_UECtxtTransfer message 208 to the old AMF 118. The old AMF 118 responds by at least sending the UE context information in a response message 210. If no UDSF is shared by the new AMF 110 and old AMF 118, as is depicted in FIG. 2, the old AMF 118 may also send the subscriber profile information to the new AMF 110. When there is a shared UDSF (not depicted in FIG. 2), either the old AMF 118 or the new AMF 110 may send a message to the UDSF to cause it to provide the subscriber profile information to the new AMF 110

In further implementations, the new AMF 110 does not send a get message 212, such as a Nudm_SDM_Get, as the get message would be redundant. It would seek to obtain for the new AMF 110 the subscriber profile information, which the new AMF 110 already has by virtue of the AMFs maintaining that information. The new AMF 110 also does not send a subscribe message 214, such as a Nudm_SDM-_Subscribe, as the UDM 112 is configured to provide updates to the AMFs without receiving subscription requests. By not sending the get message 212 and the subscribe message 214, two Nudm messages are avoided, as are the responses that would be associated with them. Any LDAP exchanges with the UDR associated with each Nudm would also be avoided. Thus, potentially eight signaling messages associated with UDM 112 may be avoided.

In various implementations, the UDM 112 sends a notification 216 of changes to the subscriber profile information, such as a Nudm_SDM_Notification, to the new AMF 110. Such a notification would be the sort of information sought by a subscribe message 214, but in FIG. 2 it is provided automatically, without the subscribe message 214, to the new AMF 110. The notification 216 may also include the updated subscriber profile information, which may be used by the new AMF 110 to update itself, the UDSF, or both. Alternatively, the notification 216 may trigger retrieval, by the AMF 110, of the updated subscriber profile information from the UDM 112.

FIG. 3 illustrates an example process. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 3 is a flow diagrams of an illustrative process at an AMF for obtaining subscriber profile information for the AMF during an AMF-to-AMF handover while optimizing signaling between the new AMF and the UDM. As illustrated at 302, a new AMF receives a registration request as part of a handover from an old AMF to the new AMF.

At 304, the new AMF receives UE context information from the old AMF. The UE context information may include at least one of UE mobility management information, security context information, a subscription permanent identifier (SUPI), 5G global unique temporary identifier (5G GUTI), or UE capabilities.

At 306, in response to receiving the registration request, the new AMF may send a registration message to the UDM.

At 308, without sending a get message to UDM, the new AMF obtains subscriber profile information. The subscriber profile information may include at least one of access management information, session management information, or subscriber data. At 310, when a UDSF is available, the obtaining may include fetching the subscriber profile information from the UDSF. The UDSF may be shared by a pool of AMFs that includes at least the old AMF and new AMF. In some implementations, the UDSF may be shared across AMFs of multiple locations or multiple AMF pools. At 312, when the UDSF is not available, the new AMF may receive the subscriber profile information from old AMF.

At 314, without sending a subscribe message to the UDM, the new AMF receives, from the UDM, notification of changes to the subscriber profile information. The UDM may send to the new AMF the notification of changes to the subscriber profile information upon receiving the registration message. The UDM may track changes to the subscriber profile information and obtain an identifier of the new AMF from information received from the new AMF or stored by the UDR to enable the UDM to send the notification of changes to the new AMF.

Figure 4:
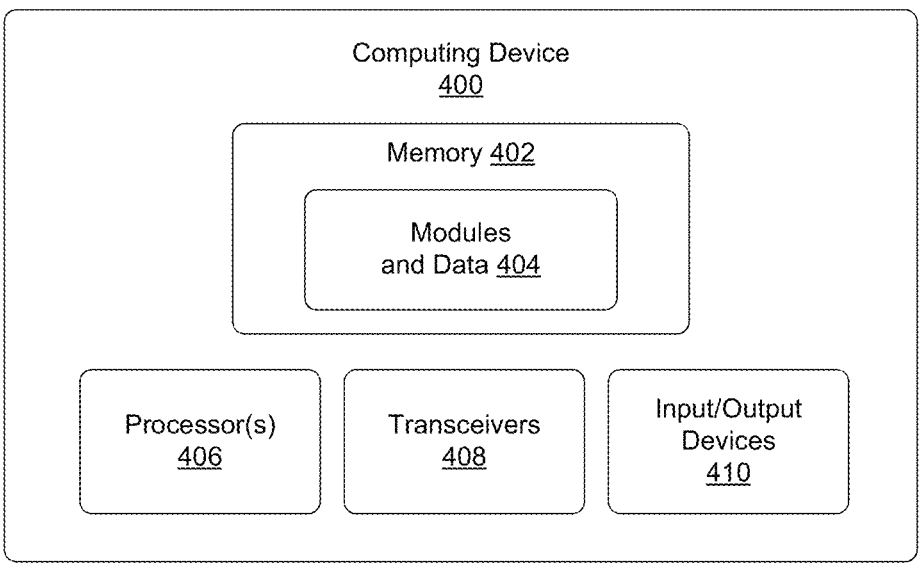
FIG. 4 is a schematic diagram of a computing device capable of implement functionality of one or more nodes of the core network.

FIG. 4 is a schematic diagram of a computing device capable of implement functionality of one or more nodes of the core network. As shown, the computing device 400 includes a memory 402 storing modules and data 404, processor(s) 406, transceivers 408, and input/output devices 410.

In various examples, the memory 402 can include system memory, which may be volatile (such as RAM), non-volatile (such as ROM, flash memory, etc.) or some combination of the two. The memory 402 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information.

The memory 402 can include one or more software or firmware elements, such as computer-readable instructions that are executable by the one or more processors 406. For example, the memory 402 can store computer-executable instructions associated with modules and data 404. The modules and data 404 can include a platform, operating system, and applications, and data utilized by the platform, operating system, and applications. Further, the modules and data 404 can implement any of the functionality for the new AMF 110, the old AMF 118, the UDSF 120, the UDM 112, the UDR 124, the UE 102, or any other node/device described and illustrated herein.

In various examples, the processor(s) 406 can be a central processing unit (CPU), a graphics processing unit (GPU), or both CPU and GPU, or any other type of processing unit. Each of the one or more processor(s) 406 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 406 may also be responsible for executing all computer applications stored in the memory 402, which can be associated with types of volatile (RAM) and/or nonvolatile (ROM) memory.

The transceivers 408 can include modems, interfaces, antennas, Ethernet ports, cable interface components, and/or other components that perform or assist in exchanging wireless communications, wired communications, or both.

While the computing device need not include input/output devices 410, in some implementations it may include one, some, or all of these. For example, the input/output devices 410 can include a display, such as a liquid crystal display or any other type of display. For example, the display may be a touch-sensitive display screen and can thus also act as an input device or keypad, such as for providing a soft-key keyboard, navigation buttons, or any other type of input. The input/output devices 410 can include any sort of output devices known in the art, such as a display, speakers, a vibrating mechanism, and/or a tactile feedback mechanism. Output devices can also include ports for one or more peripheral devices, such as headphones, peripheral speakers, and/or a peripheral display. The input/output devices 410 can include any sort of input devices known in the art. For example, input devices can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

Although features and/or methodological acts are described above, it is to be understood that the appended claims are not necessarily limited to those features or acts. Rather, the features and acts described above are disclosed as example forms of implementing the claims.

What is claimed is:

1. A method comprising:
receiving, by a new access and mobility management function (AMF), a registration request as part of a handover from an old AMF to the new AMF;
receiving, by the new AMF, user equipment (UE) context information from the old AMF;
without sending a get message to a unified data management node (UDM), obtaining, by the new AMF, subscriber profile information, the obtaining including either:
when an unstructured data storage function (UDSF) shared by a pool of AMFs that includes at least the old AMF and new AMF is available, fetching the subscriber profile information from the UDSF, and when the UDSF is not available, receiving the subscriber profile information from old AMF; and
without sending a subscribe message to the UDM, receiving from the UDM, by the new AMF, notification of changes to the subscriber profile information.

2. The method of claim 1, wherein the subscriber profile information includes at least one of access management information, session management information, or subscriber data.

3. The method of claim 1, wherein the UE context information includes at least one of UE mobility management information, security context information, a subscription permanent identifier (SUPI), 5G global unique temporary identifier (5G GUTI), or UE capabilities.

4. The method of claim 1, further comprising, in response to receiving the registration request, sending, by the new AMF, a registration message to the UDM.

5. The method of claim 4, wherein the UDM, upon receiving the registration message, sends to the new AMF the notification of changes to the subscriber profile information.

6. The method of claim 5, wherein the UDM tracks changes to the subscriber profile information and obtains an identifier of the new AMF from information received from the new AMF or stored by a unified data repository (UDR) to enable the UDM to send the notification of changes to the new AMF.

7. The method of claim 1, wherein the UDSF is shared across AMFs of multiple locations or multiple AMF pools.

8. A system comprising:
one or more processors; and
a plurality of programming instructions that, when executed by the one or more processors, configure a new access and mobility management function (AMF) to perform operations including:
receiving a registration request as part of a handover from an old AMF to the new AMF;
receiving user equipment (UE) context information from the old AMF;
without sending a get message to a unified data management node (UDM), obtaining subscriber profile information, the obtaining including either:
when an unstructured data storage function (UDSF) shared by a pool of AMFs that includes at least the old AMF and new AMF is available, fetching the subscriber profile information from the UDSF, and when the UDSF is not available, receiving the subscriber profile information from old AMF; and
without sending a subscribe message to the UDM, receiving from the UDM notification of changes to the subscriber profile information.

9. The system of claim 8, wherein the subscriber profile information includes at least one of access management information, session management information, or subscriber data.

10. The system of claim 8, wherein the UE context information includes at least one of UE mobility management information, security context information, a subscription permanent identifier (SUPI), 5G global unique temporary identifier (5G GUTI), or UE capabilities.

11. The system of claim 8, wherein the operations further include in response to receiving the registration request, sending, by the new AMF, a registration message to the UDM.

12. The system of claim 11, wherein the UDM, upon receiving the registration message, sends to the new AMF the notification of changes to the subscriber profile information.

13. The system of claim 12, wherein the UDM tracks changes to the subscriber profile information and obtains an identifier of the new AMF from information received from the new AMF or stored by a unified data repository (UDR) to enable the UDM to send the notification of changes to the new AMF.

14. The system of claim 8, wherein the UDSF is shared across AMFs of multiple locations or multiple AMF pools.

15. A non-transitory computer storage medium having a plurality of programming instructions stored thereon that, when executed by one or more processors, configure a new access and mobility management function (AMF) to perform operations comprising:

receiving a registration request as part of a handover from an old AMF to the new AMF;

receiving user equipment (UE) context information from the old AMF;

without sending a get message to a unified data management node (UDM), obtaining subscriber profile information, the obtaining including either:

when an unstructured data storage function (UDSF) shared by a pool of AMFs that includes at least the old AMF and new AMF is available, fetching the subscriber profile information from the UDSF, and when the UDSF is not available, receiving the subscriber profile information from old AMF; and without sending a subscribe message to the UDM, receiving from the UDM notification of changes to the subscriber profile information.

16. The non-transitory computer storage medium of claim 15, wherein the subscriber profile information includes at least one of access management information, session management information, or subscriber data.

17. The non-transitory computer storage medium of claim 15, wherein the UE context information includes at least one of UE mobility management information, security context information, a subscription permanent identifier (SUPI), 5G global unique temporary identifier (5G GUTI), or UE capabilities.

18. The non-transitory computer storage medium of claim 15, wherein the operations further comprise, in response to receiving the registration request, sending, by the new AMF, a registration message to the UDM.

19. The non-transitory computer storage medium of claim 18, wherein the UDM, upon receiving the registration message, sends to the new AMF the notification of changes to the subscriber profile information.

20. The non-transitory computer storage medium of claim 19, wherein the UDM tracks changes to the subscriber profile information and obtains an identifier of the new AMF from information received from the new AMF or stored by a unified data repository (UDR) to enable the UDM to send the notification of changes to the new AMF.

* * * * *